(12) United States Patent
Nakajima et al.

(10) Patent No.: US 7,756,606 B2
(45) Date of Patent: Jul. 13, 2010

(54) METHOD OF CONTROLLING REDUNDANT MANIPULATOR

(75) Inventors: Atsushi Nakajima, Tokyo (JP); Isao Yamaguchi, Tokyo (JP); Osamu Okamoto, Tokyo (JP); Yoshiaki Ohkami, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 1212 days.

(21) Appl. No.: 11/017,865

(22) Filed: Dec. 22, 2004

(65) Prior Publication Data
US 2005/0143860 A1    Jun. 30, 2005

(30) Foreign Application Priority Data
Dec. 26, 2003    (JP) ............................. 2003-435493

(51) Int. Cl.
*G06F 19/00* (2006.01)
(52) U.S. Cl. ...................... 700/245; 700/261; 700/900; 901/3; 901/8; 901/9; 901/14; 901/15; 318/568.11; 318/568.2; 318/568.21
(58) Field of Classification Search ................ 700/245, 700/261, 900; 901/3, 9, 14, 15, 8; 318/568.11, 318/568.2, 568.21
See application file for complete search history.

(56) References Cited

U.S. PATENT DOCUMENTS

| | | | | |
|---|---|---|---|---|
| 4,604,716 | A * | 8/1986 | Kato et al. ................... | 700/251 |
| 4,606,695 | A * | 8/1986 | Lenz .......................... | 414/735 |
| 4,811,248 | A * | 3/1989 | Senoh et al. ................ | 700/253 |
| 4,828,453 | A * | 5/1989 | Martin et al. ............... | 414/738 |
| 4,831,549 | A * | 5/1989 | Red et al. ................... | 700/254 |
| 4,887,222 | A * | 12/1989 | Miyake et al. .............. | 700/262 |

(Continued)

FOREIGN PATENT DOCUMENTS

JP    6-143172    5/1994

OTHER PUBLICATIONS

Ohkami et al. ( A New Algorithm for Inverse Kinematics Computation as Applied to Automatic or Manual Operations of Robot Arms, 44th Automatic Control Joint Conference, No. 01-253, pp. 462-463, Nov. 22, 2001).*

(Continued)

*Primary Examiner*—Khoi Tran
*Assistant Examiner*—Jorge O Peche
(74) *Attorney, Agent, or Firm*—Westerman, Hattori, Daniels & Adrian, LLP

(57) ABSTRACT

A method of controlling a redundant manipulator for assigning one or more redundant joints from a plurality of joints and obtaining the solution to an inverse kinematics problem at high-speed. The joints are arbitrarily classified into redundant joints and non-redundant joints, and an initial value is set for the joint angle of the classified redundant joint as a parameter. Then based on an evaluating function or a constraint condition defined by the joint angle of the redundant joint provided as a parameter and the joint angle of the non-redundant joint, which is determined by the inverse kinematics calculation according to the change of the parameter, an optimum solution of a set of joint angles is determined, and until the optimum solution covers the target range of the hand position, the procedure to determine the optimum solution is repeated with relaxing the constraint conditions.

8 Claims, 5 Drawing Sheets

U.S. PATENT DOCUMENTS

| | | | |
|---|---|---|---|
| 4,937,759 A * | 6/1990 | Vold ........................... 700/262 |
| 4,967,126 A * | 10/1990 | Gretz et al. ............ 318/568.19 |
| 4,973,215 A * | 11/1990 | Karlen et al. ............... 414/729 |
| 4,975,856 A * | 12/1990 | Vold et al. ................... 700/263 |
| 4,999,553 A * | 3/1991 | Seraji ......................... 700/245 |
| 5,019,968 A * | 5/1991 | Wang et al. ..................... 712/4 |
| 5,051,676 A * | 9/1991 | Seki et al. .............. 318/568.24 |
| 5,055,755 A * | 10/1991 | Ozawa et al. .......... 318/568.11 |
| 5,130,631 A * | 7/1992 | Gordon et al. ......... 318/568.11 |
| 5,293,461 A * | 3/1994 | Grudic et al. ............... 700/262 |
| 5,294,873 A * | 3/1994 | Seraji ...................... 318/568.1 |
| 5,341,459 A * | 8/1994 | Backes ........................ 700/260 |
| 5,357,424 A * | 10/1994 | Kakizaki et al. .............. 700/29 |
| 5,378,968 A * | 1/1995 | Ezawa et al. ............. 318/568.1 |
| 5,382,885 A * | 1/1995 | Salcudean et al. ...... 318/568.11 |
| 5,430,643 A * | 7/1995 | Seraji ........................ 700/263 |
| 5,499,320 A * | 3/1996 | Backes et al. ............... 700/260 |
| 5,581,166 A * | 12/1996 | Eismann et al. ........ 318/568.22 |
| 5,648,709 A * | 7/1997 | Maeda ................... 318/568.17 |
| 5,710,870 A * | 1/1998 | Ohm et al. ................... 700/263 |
| 5,737,500 A * | 4/1998 | Seraji et al. .................. 700/251 |
| 5,781,705 A * | 7/1998 | Endo ........................... 700/262 |
| 5,811,951 A * | 9/1998 | Young ..................... 318/568.2 |
| 5,867,631 A * | 2/1999 | Sato et al. .................... 700/262 |
| 6,057,859 A * | 5/2000 | Handelman et al. ......... 345/474 |
| 6,191,798 B1 * | 2/2001 | Handelman et al. ......... 345/473 |
| 2003/0018412 A1* | 1/2003 | Kimura ...................... 700/245 |
| 2005/0143860 A1* | 6/2005 | Nakajima et al. ........... 700/245 |
| 2006/0195223 A1* | 8/2006 | Kawai et al. ................ 700/245 |

OTHER PUBLICATIONS

Ohkami et al. (A New Algorithm for Inverse Kinematics Computation as Applied to Automatic or Manual Operations of Robot Arms, 44th Automatic Control Joint Conference, No. 01-253, pp. 462-463, Nov. 22, 2001).*

* cited by examiner (a)

(b)

METHOD OF CONTROLLING REDUNDANT MANIPULATOR

BACKGROUND OF THE INVENTION

1. Field of the Invention

The present invention relates to a method of controlling a redundant manipulator constituted by a plurality of arms which are sequentially connected via joints comprised of redundant joints and non-redundant joints, in which a joint angle, assumed by each joint, is determined when the hand position and the posture thereof are given as conditions.

2. Description of the Related Art

Manipulators comprised of a plurality of arms sequentially connected via a plurality of joints for performing various operations using various tools attached to the hand have been developed. For a manipulator having many joints to perform a predetermined operation, it is necessary to control the position of the hand and the posture of the manipulator. The position and the direction of the hand can be uniformly determined by a matrix calculation when the angle of each joint is specified, and this determination is called a "kinematics problem". On the other hand, a problem of determining each joint angle when the hand position and the posture of the manipulator are set as conditions (six variables since this involves three-dimensional conditions) is known as an "inverse kinematics problem". For the manipulator to operate, calculation to determine a solution to the inverse kinematics problem is essential, but in an inverse kinematics problem, it is regarded that there is no general analytical solution that is established for any type of manipulator. Whereas many practical use manipulator and robots have structures that can obtain analytical solutions of inverse kinematics problems. If it takes too much time to obtain a solution to an inverse kinematics problem, each joint angle can not be controlled to catch up with the constantly changing hand position and posture. Therefore determining a numerical solution to an inverse kinematics problem online and in real-time, so that the manipulator can perform an accurate operation at high-speed, has been researched.

In the case of three-dimensional space, the position and direction are determined by three variables respectively. A manipulator having seven or more joints, including a roll axis, includes over six joints that are required to determine the hand position and direction. Such an excessive number of joints are called "redundant joints", and a manipulator that includes one or more redundant joints is called a "redundant manipulator". In a practical use manipulator, a hand position and direction, other than the roll axis, are determined in advance, and a necessary operation is performed by rotating the hand around the roll axis thereof in this status. In this case, the roll axis rotation performed by the joint of the hand of the manipulator can be handled independently from the hand position and rotation around other axe, so independent variables to determine the direction, as an inverse kinematics problem, can be decreased, that is to two variables. Therefore the inverse kinematics problem becomes a problem to solve a total of five variables, the above two variables and three variables for determining a position in the three-dimensional space (see the non-patent publication, Yoshiaki Ohkami, Osamu Okamoto, Tomoya Shibata, 44th Automatic Control Joint Conference, No. 01-253, Nov. 22, 2001, pp. 462-463). Even a redundant manipulator becomes a non-redundant manipulator, where all five joints, other than the roll axis, are non-redundant joints if the redundant joints and joint angles thereof are specified. Therefore normally five joint angles are solved as an inverse kinematics problem. To solve this inverse kinematics problem, it has been proposed that an integrated vector is defined for the hand position and posture, and a numerical solution of the joint angle of the manipulator is obtained by convergence calculation by repeat based on the Newton-Raphson Method.

As an example of controlling a redundant manipulator that has seven degrees of freedom, a control method of assigning one joint as a joint for controlling the redundancy freedom and the other six joints as joints for hand motion control, and determining the motion of a hand having six degrees of freedom (including roll axis) by the six joints for hand motion control, has been proposed (see Japanese Patent Application Laid-Open No. H6-143172 (paragraph [0030]-[0047], FIG. 1, FIG. 4, FIG. 5)). According to this method of controlling a redundant manipulator, the redundancy freedom control means determines the hand position and posture by a kinematics (forward kinematics) equation using the data detected by the angle detection means. If one of the joints is defined as the joint for redundancy freedom control, the joint angle of the joint becomes a parameterized joint angle, and the manipulator has six degrees of freedom only for the joints for hand motion control, so the equation of an inverse kinematics problem can be solved as a solution that depends on the parameter. Using each joint angle obtained by the calculation, the potential value of the evaluating function is determined, and the joint angle of the joint for the redundancy freedom control, that was handled as a parameter, is determined by this evaluation, and the velocity command values for the joints for hand motion control are output. The hand motion control means, on the other hand, solves the inverse kinematics equation using the present joint angles and the kinematics target value instruction means, and determines the velocity command values of the joints for hand motion control. Operation of the manipulator is controlled by sending the determined velocity command values to each joint control means. The redundancy freedom control and the hand motion control are independently performed, which makes it possible to set a control period independently and to decrease the sampling period, so that the redundant manipulator can operate in real-time.

However in the above prior art, there is one redundant joint, and it is disclosed how wide the joint angle of the redundant joint will be determined when one redundant joint is defined, but no disclosure is provided on how to determine the redundant joint out of a plurality of joints, or how to assign redundant joints when there are many redundant joints, and at the moment this is determined simply based on experiment.

Therefore there is a problem to solve in terms of obtaining a solution to an inverse kinematics problem by appropriately assigning one or more redundant joints from a plurality of joints, even if the redundant manipulator has a general structure which could have a plurality of redundant joints, and determining the joint angles of non-redundant joints at high-speed after the redundant joints are assigned.

SUMMARY OF THE INVENTION

It is an object of the present invention to provide a method of controlling a robot which allows obtaining a solution to an inverse kinematics problem at high-speed even for a general arbitrary manipulator by appropriately and automatically assigning one or more redundant joints from a plurality of joints.

To solve the above problem, the method of controlling a redundant manipulator according to the present invention is a method of controlling a redundant manipulator for controlling the operation of a hand of a redundant manipulator, comprised of a plurality of arms sequentially connected to the hand via joints, comprised of redundant joints and non-redundant joints, by determining a joint angle that each of the joints forms when the position and direction of the hand are specified, comprising the steps of: classifying the joints into redundant joints and non-redundant joints; determining an optimum solution of a joint angle of the classified redundant joint when the joint angle is changed as a parameter, based on the evaluating function and constraint conditions using the joint angle of the redundant joint provided as the parameter and the joint angle of the non-redundant joint obtained as a solution by inverse kinematics calculation; judging whether the optimum solution covers a target range of the hand position; and changing the evaluating function or relaxing the constraint conditions and repeating the procedure to determine the optimum solution if the judgment result is negative.

In this method of controlling a redundant manipulator, the redundant manipulator is comprised of a plurality of arms sequentially connected to the hand via joints, comprised of one or more redundant joints and non-redundant joints, and when the position and direction of the hand are specified, the joint angle which each joint forms is determined and operation, including the position and direction of the hand, is controlled. First the joints are arbitrarily classified into redundant joints and non-redundant joints, and an initial value is set for a joint angle of a redundant joint as a parameter. Since the joint angle is set as a parameter value for a redundant joint, the joint angle of the non-redundant joint can be solved by inverse kinematics calculation, as a numerical solution, for example. Whether the combination of the joint angle of the redundant joint that is set as a parameter and the joint angle of the non-redundant joint solved by the inverse kinematics calculation is the optimum or not cannot be immediately known. Therefore the evaluating function and the constraint conditions, using a joint angle of a redundant joint provided as a parameter and a joint angle of a non-redundant joint which is determined by inverse kinematics calculation according to the changed parameter, are defined in advance. And based on the evaluating function and the constraint conditions, an optimum solution of a set of joint angles is determined, and when the optimum solution covers the target range of the hand position, that is reaches the final target range of the hand position, this optimum solution is set as the final optimum solution. If the target range of the hand position is not covered, the evaluating function is changed or the constraint conditions are relaxed, and a procedure to determine the optimum solution is repeated again to determine the final optimum solution to cover the target range of the hand position.

In this method of controlling a redundant manipulator, the evaluating function can be a square-sum of the joint angle of the redundant joint. The evaluating function can also be a square-sum of the difference of two of the joint angles adjacent to each other. In the control of a manipulator, it is more effective to operate each joint as the value of each joint angle becomes smaller. So the evaluating function is defined as the square-sum of the joint angle, which is an angular displacement from a neutral point of the redundant joint, and evaluation is performed such that the square-sum becomes the minimum (smallest). It is also possible to define the evaluating function as a square-sum of the difference of two adjacent joint angles, and the evaluation is low if the two adjacent joint angles change considerably, and evaluation is high if the change of the joint angles in the two adjacent joints is small. In the evaluating function, the above mentioned square-sum may be a square-sum with a weight factor, which is obtained by multiplying each term by a position weight factor of which the total becomes 1, so that each joint is weighted in the evaluating function.

In this method of controlling the redundant manipulator, the evaluating function can be a reciprocal number of the absolute value a Jacobian matrix that provides the sensitivity to the hand when the angular velocity of each joint angle is given. In other words, the reciprocal number of the absolute value of the Jacobian matrix can be regarded as an index to change the unit angular velocity of the hand, where control is more effective as the change amount of changing the angular velocity of each joint angle is smaller. In this method, it may become difficult to consider the constraint conditions of the joint limit, so if calculation is repeated to obtain the optimum solution of a set of joint angles, the evaluating function may be changed.

In this method of controlling a redundant manipulator, in the inverse kinematics calculation and the calculation for determining the optimum solution of the joint angle, an integrated vector, comprised of the hand position vector and posture vector, can be used. Using the integrated vector where the hand position vector and hand direction vector are integrated, the status of the hand can be expressed. The dimensions can be a total of five dimensions, that is three dimensions for the position and two dimensions for the direction, excluding direction around the roll axis of the hand.

The integrated vector can be a corrected integrated vector comprised of elements with the weight factor obtained by respectively multiplying each element by a positive weight factor of which the total becomes 1. By using a corrected integrated vector where each element is corrected by a weight for the integrated vector, weight can be provided to each element constituting the integrated vector when the optimum solution of the joint angle is determined.

In this method of controlling a redundant manipulator, the inverse kinematics calculation is performed by the Newton-Raphson Method, in which an initial value is provided to the joint angle, then a product of the Jacobian inverse matrix multiplied by a difference vector between the integrated vector before correction and the target integrated vector is subtracted from the joint angle before correction to determine the joint angle after correction, then iterative calculation is performed for obtaining the integrated vector after correction by direct kinematics calculation based on the joint angle after correction, and the joint angle after correction when the norm of the difference vector is converged to a predetermined value or less is regarded as an approximate solution. Each joint angle after correction is determined using the Jacobian inverse matrix, and the integrated vector after correction can be obtained by forward kinematics calculation using each joint angle after correction. Since the iterative calculation is judged as converged when the norm of the difference of the integrated vectors before and after correction converges to a predetermined value or less, the joint angle after correction can be numerically determined as an approximate solution of the inverse kinematics calculation.

In this method of controlling a redundant manipulator, the roll angle of the hand can be determined independently from other joint angles. Since the roll angle of the hand can be determined with a required rotation amount after the five dimensional vectors of the other positions and directions of the hand are determined, the roll angle of the hand can be determined independently.

DESCRIPTION OF THE PREFERRED EMBODIMENTS

Figure 3:
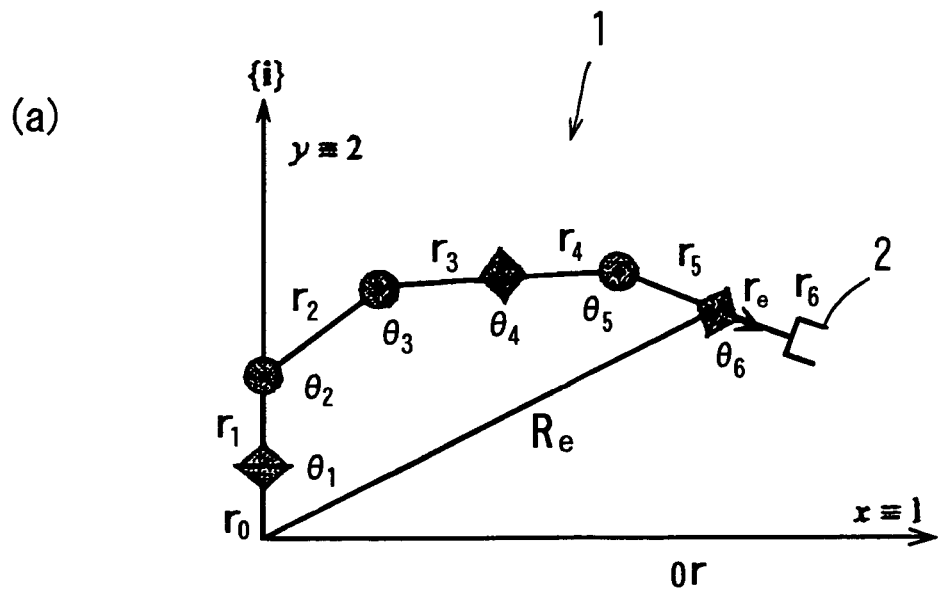
FIG. 3(a) is a diagram depicting a conventional standard manipulator.
FIG. 3(b) is a perspective view depicting a conventional standard manipulator.
Figure 3:
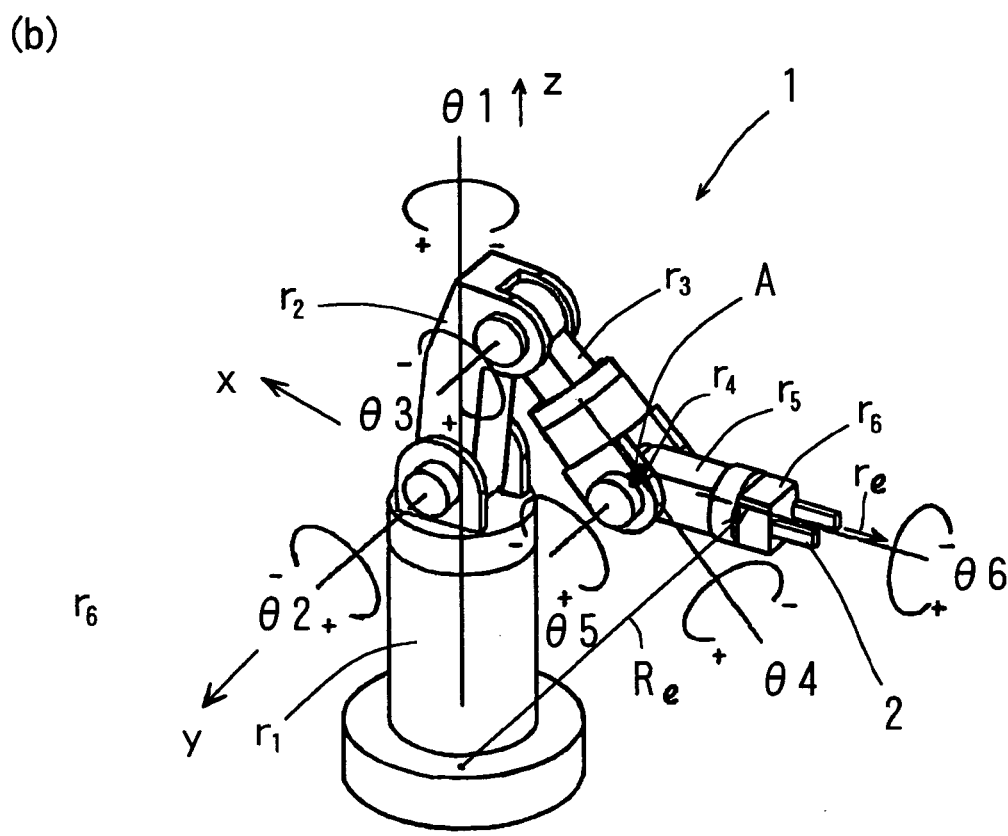

Embodiments of the method of controlling a manipulator according to the present invention will now be described with reference to the accompanying drawings. FIG. 3 is a perspective view depicting the manipulator to which the method of controlling a manipulator according to the present invention will be applied.

FIG. 3 shows a definition of the joint angle of a manipulator. FIG. 3(a) is a diagram depicting a standard manipulator, and FIG. 3(b) is a perspective view depicting the manipulator more specifically. The manipulator 1 is comprised of arms r1-r6 which are sequentially connected as movable links via joints (having joint angle $\theta1$-$\theta6$ respectively) with the arm r0 as a fixed link, and the hand 2 for performing various operations at the end of the arm. The vector from the base point of the arm r0 to the base end of the hand 2 is shown by $R_e$, and the unit direction vector of the hand 2 is shown by $r_e$. The x y z rectangular coordinate system is set so as to form the right hand system as shown in FIG. 3(b). The manipulator 1 shown in FIG. 3(b) has a structure where the three axes of the hand 2 (in the example of FIG. 3(b), joint angles $\theta4$, $\theta5$ and $\theta6$) cross at one point A. The arm r4 has zero length and can rotate around its own rotation axis, where the rotation angle is expressed by joint angle $\theta4$. The arm r5 can rotate around the rotation axis which orthogonally crosses the rotation axis of the arm r4, and its rotation angle is expressed by joint angle $\theta5$. The arm r6 can rotate the hand 2 only around its own rotation axis as the joint angle $\theta6$ shows, and this rotation axis crosses the intersection A of the rotation axes of the arm r4 and the arm r5.

The forward kinematics problem involves calculating the position and posture of the hand 2 when each joint angle $\theta1$-$\theta6$ of the manipulator 1 is given. Expression (1) expresses the relative direction cosine matrix $C^i$ of the i-th link coordinate system with respect to the (i−1)th link coordinate system. Here $T_2$ and $T_3$ are the direction cosine metrics to indicate the basic rotation conversion around two axes or three axes respectively, and are given by expression 2.

[Expression 1]

$$C^1 = T_3(\theta_1)$$

$$C^2 = T_2(\theta_2)$$

$$C^3 = T_2(\theta_3)$$

$$C^4 = T_3(\theta_4)$$

$$C^5 = T_2(\theta_5)$$

$$C^6 = T_3(\theta_6) \qquad (1)$$

[Expression 2]

$$T_2(\theta) = \begin{bmatrix} \cos\theta & 0 & -\sin\theta \\ 0 & 1 & 0 \\ \sin\theta & 0 & \cos\theta \end{bmatrix} \qquad (2)$$

$$T_3(\theta) = \begin{bmatrix} \cos\theta & \sin\theta & 0 \\ -\sin\theta & \cos\theta & 0 \\ 0 & 0 & 1 \end{bmatrix}$$

Therefore the direction cosine matrix $D^i$, from the inertial coordinate system to the i-th link coordinate system, is given by expression (3).

[Expression 3]

$$D^1 = C^1$$

$$D^2 = C^2 C^1$$

$$D^3 = C^3 C^2 C^1$$

$$D^4 = C^4 C^3 C^2 C^1$$

$$D^5 = C^5 C^4 C^3 C^2 C^1$$

$$D^6 = C^6 C^5 C^4 C^3 C^2 C^1 \qquad (3)$$

Since the final joint has a roll axis rotation (joint angle $\theta6$), the position of the hand 2 depends on the joint angles $\theta1$, $\theta2$, ..., $\theta5$, and is expressed as functions thereof. In the later mentioned inverse kinematics problem, it is at the moment regarded that an analytical solution exists only when each rotation axis of the joint angles $\theta4$, $\theta5$ and $\theta6$ cross at one point A, as shown in FIG. 1(b).

The inertial coordinate system (preferably an inertial coordinate system that also considers the rotation of earth) is expressed by $\{i\}$, and the unit vector $r_e$ to indicate the direction of the hand 2 is expressed by expression (4), and the vector from the origin to the hand 2 is regarded as $R_e$.

[Expression 4]

$$r_e = \{i\}^T r_e, \quad r_e = \begin{bmatrix} r_{e1} \\ r_{e2} \\ r_{e3} \end{bmatrix} \qquad (4)$$

Since the direction vector $r_e$ is a unit vector, the square-sum of each element is 1, as shown in expression (5), and there are two independent variables in $r_e1$-$r_e3$.

[Expression 5]

$$r_{e1}^2 + r_{e2}^2 + r_{e3}^2 = 1 \qquad (5)$$

Therefore the direction unit vector $r_e$ is expressed by two variables, as shown in expression (6).

[Expression 6]

$$r_e = \begin{bmatrix} r_{e1} \\ r_{e2} \\ r_{e3} \end{bmatrix} \Rightarrow \begin{bmatrix} r_{e2} \\ r_{e3} \end{bmatrix} \qquad r_{e1} = \sqrt{1-(r_{e2}^2 + r_{e3}^2)} \tag{6}$$

The hand position vector $R_e (= \{i\}^T R_e)$, extending from the origin to the hand 2, is given by expression (7) as the sum of the vectors of each arm r0-r5. DCM is a direction cosine matrix (3×3 orthogonal matrix).

[Expression 7]

$$R_e = r_0 + r_1 + r_2 + r_3 + r_4 + r_5$$

Therefore $$Re = r0 + C^{m1T} r_1 + C^{m1T} C^{m2T} r_2 + C^{m1T} C^{m2T} C^{m3T} r_3 + \tag{7}$$
$$C^{m1T} C^{m2T} C^{m3T} C^{m4T} r_4 + C^{m1T} C^{m2T} C^{m3T} C^{m4T} C^{m5T} r_5$$

where C=DCM(θ1, θ2, θ3, θ4, θ5, θ6)

As a consequence, the vector X with five variables, that is two elements of the hand direction unit vector and three elements of the hand position, as shown in expression (8), can be defined as the integrated vector.

[Expression 8]

$$X = [r_{e2} \ r_{e3} \ R_{e1} \ R_{e2} \ R_{e3}]^T \tag{8}$$

From expression (5) and expression (7), the integrated vector X is expressed as a function of the $1^{st}$-$5^{th}$ joint angles, as shown in expression (9). The integrated vector can be a corrected integrated vector comprised of elements with weight factors which are obtained by multiplying each element by a positive weight factor $\alpha_i$ ($\alpha_i > 0$, $\Sigma \alpha_i = 1$) of which the total is 1. By assigning a relative weight factor to each element, the convergence values of an element is more restricted when the optimum solution is determined as the weight assigned is larger, and controllability can be further improved.

[Expression 9]

$$X = f(\theta_1, \theta_2, \theta_3, \theta_4, \theta_5) \tag{9}$$

If expression (9) is differentiated by time, it is expressed by expression (10). Here $\delta/\delta t$ ($r_e$ (2, 3)) is a 2 rows×1 column matrix, and $\delta/\delta t(R_e)$ is a 3 rows×1 column matrix.

[Expression 10]

$$\dot{X} = \begin{bmatrix} \dot{r}_{e(2,3)} \\ \dot{R}_e \end{bmatrix} = J_{5 \times 5} \begin{bmatrix} \dot{\theta}_1 \\ \dot{\theta}_2 \\ \dot{\theta}_3 \\ \dot{\theta}_4 \\ \dot{\theta}_5 \end{bmatrix} \tag{10}$$

When the angular velocity of each joint angle θ1-θ5 of the integrated vector X, which is comprised of five elements of the hand direction unit vector $r_e$ and the hand position vector $R_e$, are given, the sensitivity of the hand 2, that is the Jacobian J which provides the moving velocity and the posture angle rate (or angular velocity) of the hand 2, can be defined. The Jacobian J is a 5 rows×5 columns matrix (in other words, the final rotation axis direction is removed from the six variables comprised of the position and direction for three axes), and is given by expression (11). In the case when posture is indicated by a Eulerian angle, if the Jacobian is defined by the posture angle rate, then control may become impossible since the manipulator enters an improper status when the hand faces directly up or directly down (an irregular point problem, the description thereof is omitted here).

[Expression 11]

$$J_{5 \times 5} = \tag{11}$$

$$\begin{bmatrix} \left[\frac{\partial r_e}{\partial \theta_1}\right]_{2 \times 1} & \left[\frac{\partial r_e}{\partial \theta_2}\right]_{2 \times 1} & \left[\frac{\partial r_e}{\partial \theta_3}\right]_{2 \times 1} & \left[\frac{\partial r_e}{\partial \theta_4}\right]_{2 \times 1} & \left[\frac{\partial r_e}{\partial \theta_5}\right]_{2 \times 1} \\ \left[\frac{\partial R_e}{\partial \theta_1}\right]_{3 \times 1} & \left[\frac{\partial R_e}{\partial \theta_2}\right]_{3 \times 1} & \left[\frac{\partial R_e}{\partial \theta_3}\right]_{3 \times 1} & \left[\frac{\partial R_e}{\partial \theta_4}\right]_{3 \times 1} & \left[\frac{\partial R_e}{\partial \theta_5}\right]_{3 \times 1} \end{bmatrix}$$

ただし, $\left[\frac{\partial r_e}{\partial \theta_1}\right]_{2 \times 1} = \begin{bmatrix} \left(\frac{\partial r_e}{\partial \theta_1}\right)_2 \\ \left(\frac{\partial r_e}{\partial \theta_1}\right)_3 \end{bmatrix}$ When the target value of the integrated vector X of the position and direction of the hand is given, the joint angle $\theta_n$ (joint angle of non-redundant joint: n=1, 2, ..., 5) for the hand to achieve this target value is determined, and this calculation is an inverse kinematics calculation. The joint angle $\theta_n$ can be determined as a numerical solution using the Newton-Raphson Method. In other words, it is assumed that the target value of the integrated vector X is the target integrated vector $X_t$ and the integrated vector for the initial value $\theta_{n0}$ is X0. In this case the difference vector $\Delta X_n$ between the calculation value $X_n$ in the iterative calculation for the nth time on the integrated vector and the target integrated vector $X_t$ is given by expression (12).

[Expression 12]

$$\Delta X_n = X_n - X_t \tag{12}$$

The following calculation is repeated until the norm of the difference vector $\Delta X_n$ satisfies the set value. The calculation value $\theta_{I,j+1}$ for j+1 times of the i-th joint angle $\theta_i$ is expressed as follows using the previous calculation time $\theta_{I,j}$ and Jacobian J and the difference vector $\Delta X_j$. In other words, when the velocity of the hand and the posture angular velocity (hand angular velocity) are given, and the joint angular velocity at each joint of the manipulator is calculated, the joint angular velocity can be calculated, as shown in Expression (13), by multiplying the velocity and the posture angular velocity by an inverse Jacobian $J^{-1}$, which is the inverse matrix of expression (11).

[Expression 13]

$$\theta_{i,j+1} = \theta_{i,j} - J^{-1} \Delta X_j \tag{13}$$

When the difference vector $\Delta X_n$ becomes a predetermined constant value or less, it is judged that the calculation converged. The above calculation method (Expression (1)-Expression (13)) can also be applied to non-redundant joints (the above 5 joints and roll axis joint) if the redundant joint is handled as a parameter in the case of a redundant manipulator.

Figure 4:
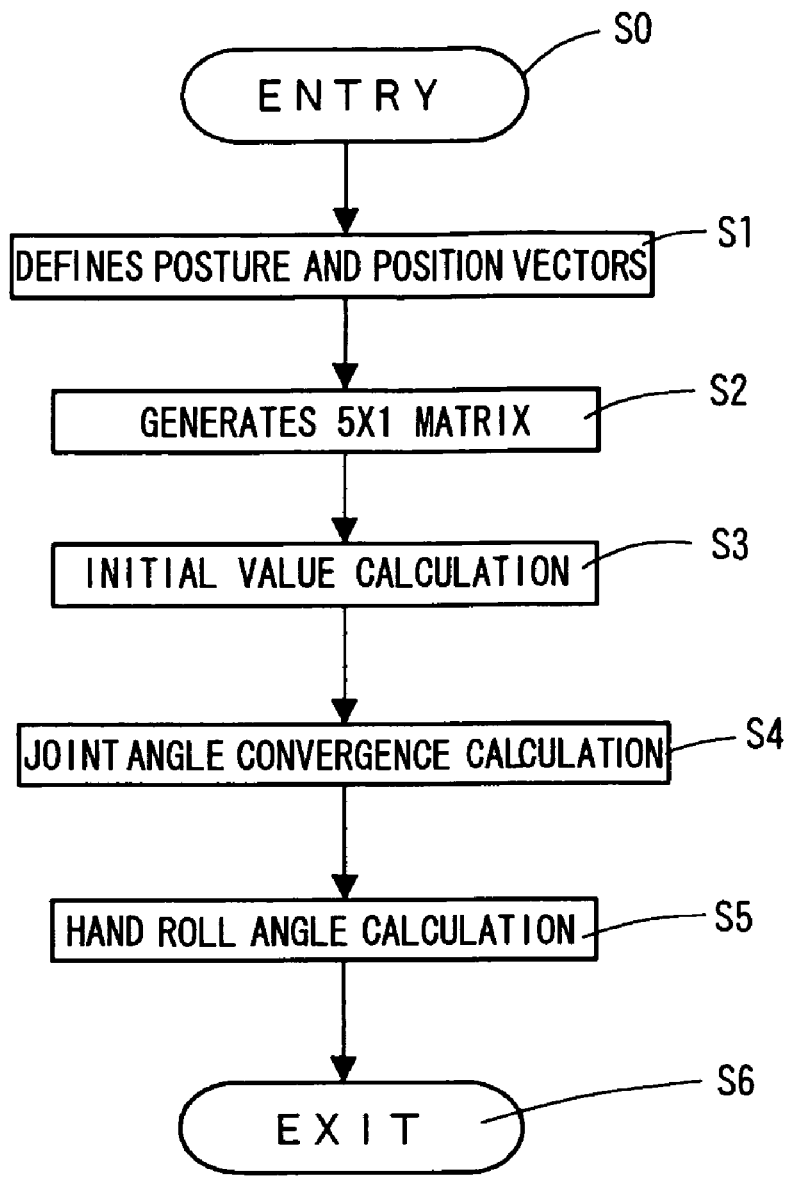
FIG. 4 is an example of a flow chart depicting a general algorithm in the method of controlling a manipulator.

FIG. 4 is a flow chart depicting a procedure to determine the position and direction of the hand 2 in the method of controlling the manipulator when the above redundant joint is not considered (that is, when joints are all non-redundant joints).

According to this flow chart, after entry (step 0, hereafter called "S0") and the reading of the initial values of all the joint angles (default values or specified by the user), the posture and position vectors of the hand 2 (see FIG. 1) are defined (S1). In other words, the direction unit vector $r_e$ of the hand 2 is defined by the two variables as shown in expression (6), and the position vector $R_e$ of the hand 2 is defined by expression (7).

The 5×1 matrix of the integrated vector X on the hand 2 is generated (S2). By the definition in S1, X is expressed by a function with five variables of the hand direction unit vector $r_e$ and the hand position vector $R_e$, as shown in expression (8).

The initial values of the hand 2 are calculated by forward kinematics calculation based on the joint angles read in the entry (S3).

Then by applying inverse kinematics calculation, joint angle convergence calculation is performed (S4). In other words, the initial values of the hand 2, determined in S3, are normally different from the target integrated vector $X_t$, so the values of each joint angle is determined by the above mentioned iterative calculation Newton-Raphson Method, so as to match the actual position and direction of the hand 2 with the position and direction determined by the target integrated vector $X_t$. The joint angle, when it is judged that the difference vector $\Delta X_n$ from the target integrated vector $X_t$ sufficiently converged to zero in the iterative calculation, is regarded as each joint angle to be determined.

Then the roll angle of the hand 2 is calculated (S5). If each joint angle for determining the position and direction of the hand 2 is determined, the joint angle around the roll axis of the hand 2 is calculated as a joint angle to be determined last.

Since all the joint angles including the roll axis of the hand 2 are determined, processing ends, and this flow chart is exited (S6).

Figure 5:
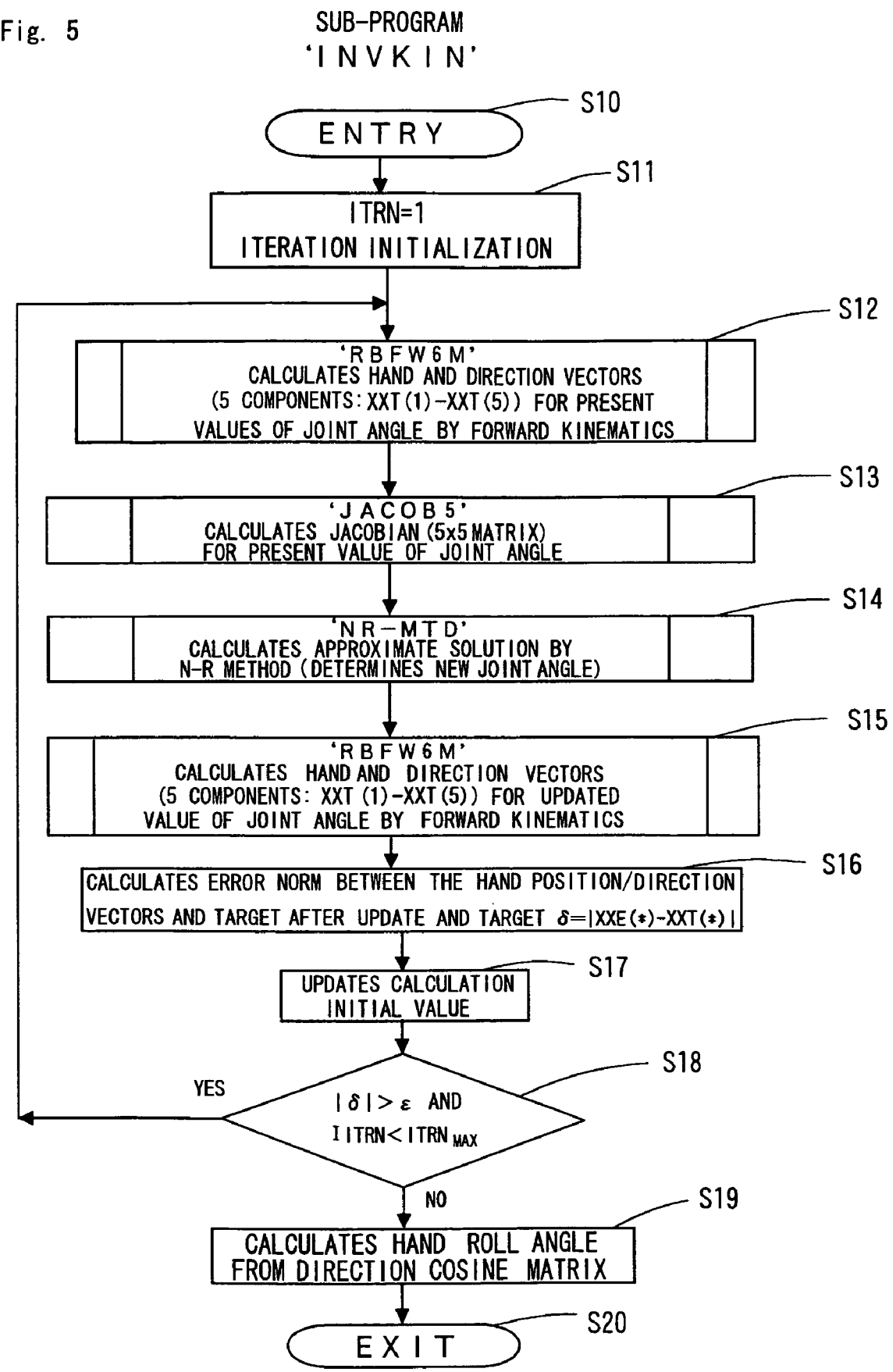
FIG. 5 is a flow chart depicting the inverse kinematics calculation sub-routine to be executed by the method of controlling a manipulator.

FIG. 5 shows a concrete example of the joint angle convergence calculation in S4 of the flow chart in FIG. 4. FIG. 5 is a flow chart ('INVKIN') of a sub-routine for performing the joint angle convergence calculation by applying the inverse kinematics calculation.

After entry to the flow chart (S10), initialization is performed according to the Newton-Raphson Method (hereafter called "N-R" method) (S11). In other words, iteration is initialized by setting the number of repeats ITRN=1.

Then using the forward kinematics sub-routine "RBFW6M", the hand direction vector (five components of integrated vector: XXT (1)-XXT (5)) is calculated for the present values of the joint angles (S12).

Using the sub-routine "JACOB 5", the Jacobian (5×5 matrix) for the present values of the joint angles are calculated (S13). In other words, the Jacobian for the arbitrary shape and the degree of freedom in arrangement are calculated.

Using the sub-routine "NR-MTD", the approximate solution based on the N-R method is calculated (new joint angle (updated value) is determined) (S14). The sub-routine "NR-MTD" is a routine for determining the updated value $(\theta_{i+1})$ based on expression (13).

Using the generalized forward kinematics sub-routine "RBFW6M", the hand position and direction vector (five components: XXT (1)-XXT (5)), corresponding to the update values of the joint angles, are calculated (S15).

The error norm $\delta = |XXE(*) - XXT(*)|$ between the hand position and direction vector after update and the hand position and direction vector to be the target is calculated (S16).

The calculation initial values are updated (S17).

Then it is judged whether the N-R method is continued (S18). In other words, processing returns to S12 when it is judged that $|\delta| > \epsilon$ and ITRN<ITRN max.

If the judgment result in S18 is negative, the hand roll angle is calculated from the direction cosine matrix (S19).

The sub-routine is exited (S20).

Figure 1:
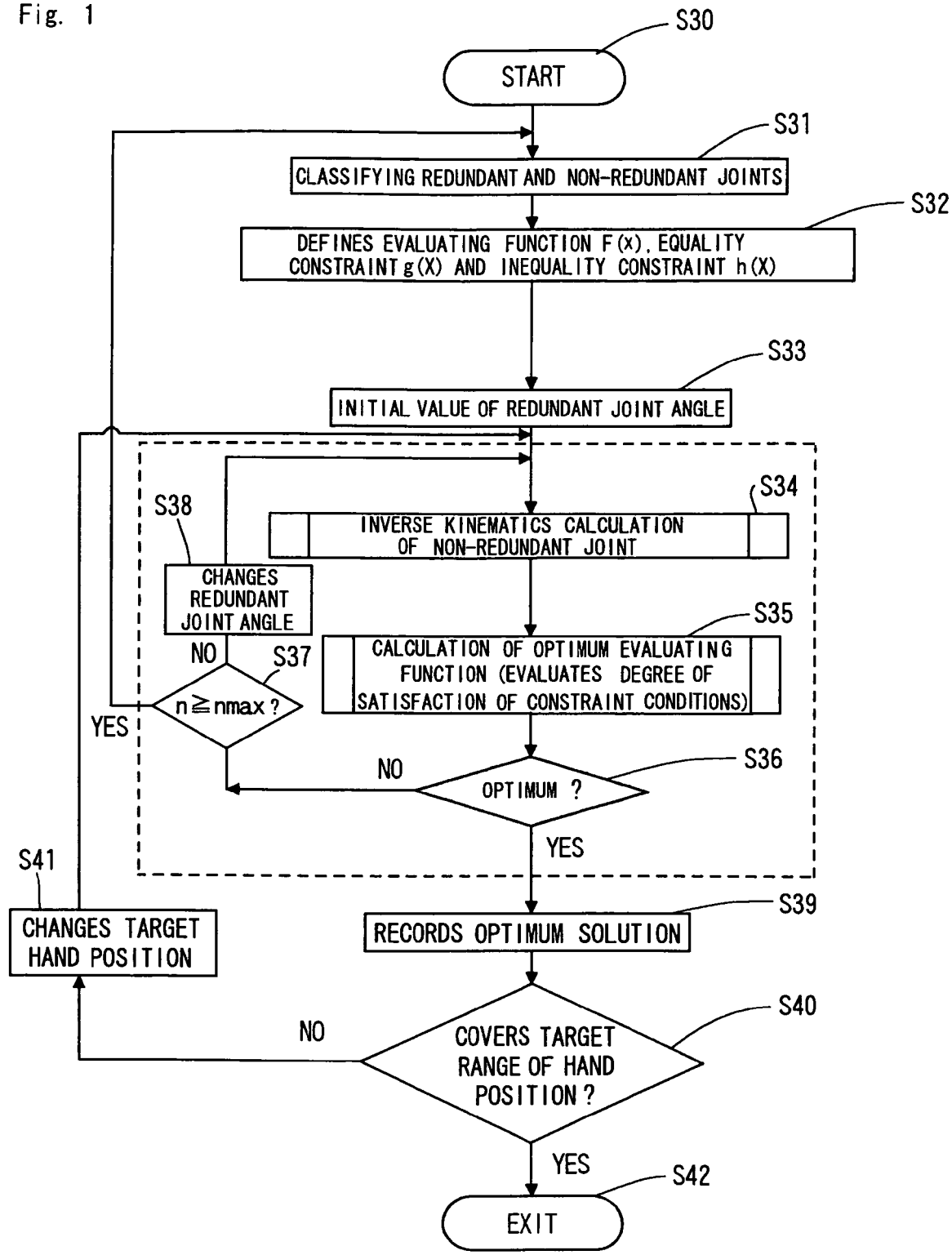
FIG. 1 is a flow chart depicting the main program of a method of controlling the redundant manipulator according to the present invention.

Now the procedure to determine all the joint angles in the case of the redundant manipulator, including the redundant joints, according to the present invention, will be described with reference to the flow chart shown in FIG. 1. FIG. 1 is a flow chart depicting the main routine to determine all the joint angles of the redundant manipulator comprised of redundant joints and non-redundant joints.

When the main flow chart starts (S30), joints are classified into redundant joints and non-redundant joints (S31). A characteristic of the present invention is that the number of redundant joints is not limited to one, but can be any number. Even if there are a plurality of redundant joints, the joints can be classified into redundant joints and non-redundant joints according to the combination thereof.

As a condition to define a redundant joint, the evaluating function F (X), equality constraint g (X) and inequality constraint h (X) are defined (S32). In other words, for the integrated vector X of the position and direction of the hand 2, the conditions expressed by an equality constraint g (X) and inequality constraint h (X) or an evaluating function F (X) for evaluating the size of the value in the possible value range of the integrated vector X are defined. The second characteristic of the present invention is that the arbitrary evaluating function or the constraint conditions can be handled in this step, which improves practicality. Normally both the evaluating function and the constraint condition are not used.

Now the initial value (s) of the joint angle (s) of all the redundant joints (one or a plurality of) classified in S31 are set (S33).

Since the initial value of the joint angle is set for all the redundant joints, the joint angles of the already classified non-redundant joints are solved as an inverse kinematics problem to obtain the position and direction of the hand 2 (S34). In the solution of the inverse kinematics problem, the problem can be solved as a numerical solution which converges by the iterative calculation based on the N-R method applying the sub-routine "INVKIN" shown in FIG. 5, as described above.

Since the value has been determined for all the joint angles as a set value or a numerical solution, optimality is calculated by the evaluating function F (X) (S35). The evaluating function F is a function for evaluating the satisfaction of the constraint conditions g (X) and h (X).

Based on the calculation result of the evaluating function F (X) in S35, whether the joint angles are the optimum or not is judged (S36). If it is judged that the joint angles are the optimum, processing exists from the loop, but if it is judged that the joint angles are not the optimum solution, processing returns to the inverse kinematics calculation of the non-redundant joints (S34). In this case, it is judged whether the number of times of iterative calculation n exceeds the maximum value nmax by this returning (S37). If the number of times of iterative calculation n does not exceed the maximum value nmax, the joint angles of the redundant joints are changed (S38). Until the optimum solution is determined, the joint angle of a redundant joint is handled as a parameter, and the value of the joint angle of the redundant joint is changed. The width of the values to be changed is defined and set appropriately by the user. After changing the value of the joint angle of the redundant joint, processing returns to S34, where the joint angle of a non-redundant joint is recalculated using the joint angle of the changed redundant joint. The procedures in S34-S38 in the range enclosed by the dotted line are the same as the procedures based on the method disclosed in the above mentioned Japanese Patent Application Laid-Open No. H6-143172. If it is judged in S37 that the number of times of iterative calculation n becomes the maximum value n max or more, processing returns to S31 and joints are reclassified into redundant joints and non-redundant joints.

If an optimum solution of the joint angle is determined in S36, the optimum solution is recorded (S39).

It is judged whether the joint angle recorded as the optimum solution in S39 covers the target range of the hand position of the redundant manipulator 1 or not, that is whether the hand 2 of the redundant manipulator 1 reaches the final target position (including a predetermined final target range) or not (S40). If the judgment in S40 results in NO, the hand target positions that are sequentially set between the start point of the hand 2 to the final target position are changed to relax the constrain conditions (S41), and processing returns to the inverse kinematics calculation of non-redundant joints (S34). If the judgment in S40 results in YES, processing ends and exits this flow chart (S42).

Figure 2:
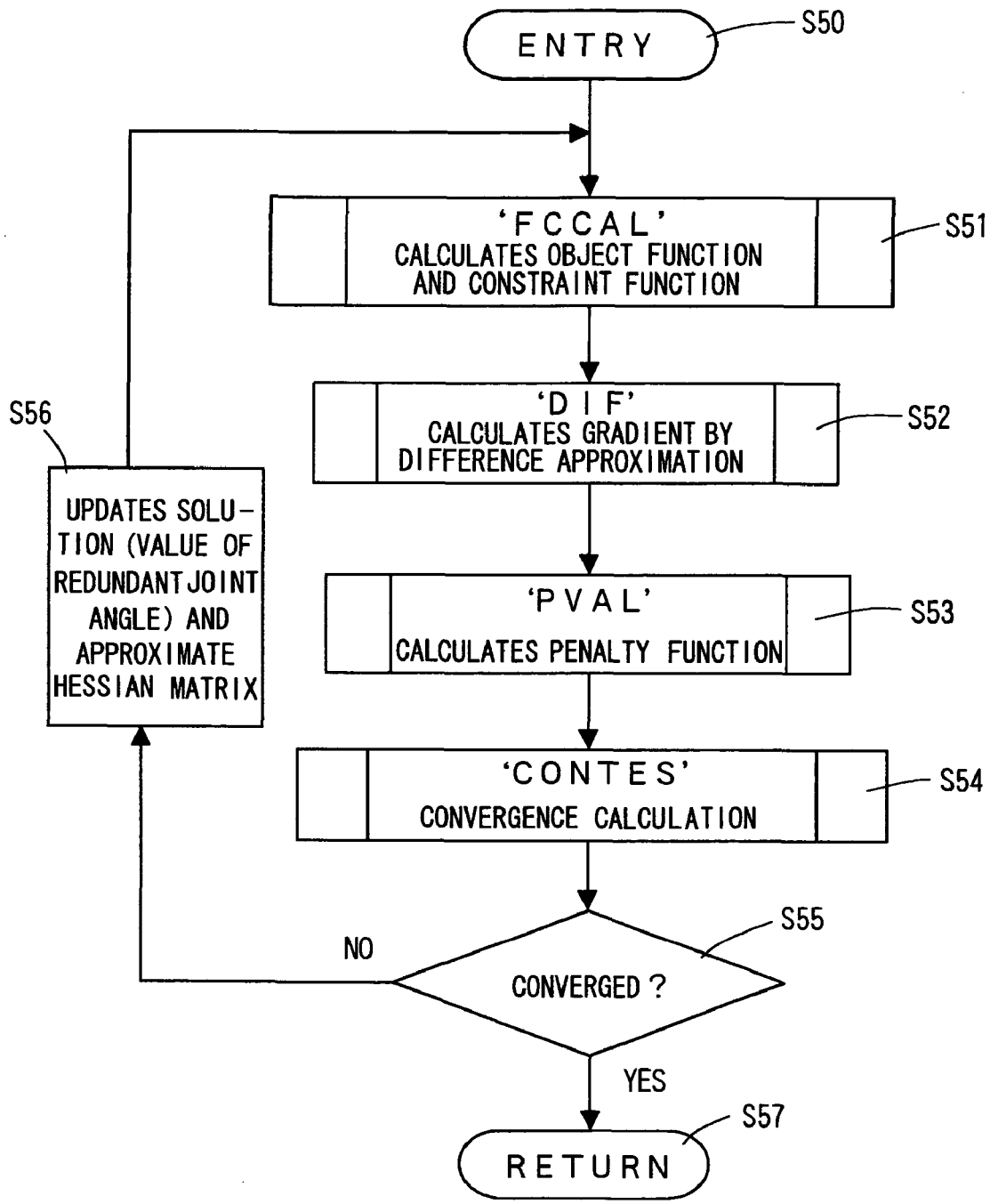
FIG. 2 is a flow chart depicting a sub-routine to indicate the details of the calculation of the evaluating function in the main routine shown in FIG. 1.

Now the decision sub-routine by the optimization method of the redundant joint angle in S35 of the flow chart of the main routine will be described referring to FIG. 2. FIG. 2 is a flow chart depicting the sub-routine of the details of the evaluating function calculation in S35 of the main routine shown in FIG. 1, and is comprised of the entry to the sub-routine (S50), calculation of the object function and restriction function (constraint function) ('FCCAL': S51), calculation of the gradient by differential approximation ('DIF': S52), calculation of the penalty function value ("PVAL": S53), convergence calculation ('CONTES': S54), judgment on whether the calculation in S54 converted (S55), and end of the sub-program and return to the main program when the judgment in S55 results in YES (converged) (S57), and the update of the solution (redundant joint angle) and the approximate Hessian matrix for returning to S51 and repeating the calculation again when the judgment in S55 results in NO (not converged) (S46). The Hessian matrix is a matrix used for judging the limit value when there are several variables, where the limit value of the function of several variables can be known by checking positive definition, but the calculation is so complicated that an approximate Hessian matrix is used as a more simplified matrix. The decision sub-routine based on this optimization method is described in detail for example in "Fortran 77 optimization programming" by Toshihide Ibaragi and Masao Fukushima, published by Iwanami Shoten (1991), so here further description is omitted.

To determine a redundant joint angle, an optimization method must be applied. In other words, m number of redundant joints $\phi 1, \phi 2, \ldots, \phi m$ are decided so as to minimize (optimize) an evaluating function F.

[Expression 14]

$$F = F(\phi 1, \phi 2, \ldots \phi m; \theta 2, \ldots \theta 5, \theta 6)$$

Here $\theta 1, \theta 2, \ldots, \theta 5, \theta 6$ are the joint angles of the non-redundant joints to be determined as the inverse kinematics problem. As the function F, the following functions may be used.

(1) Sum of angular deviation from the neutral point

[Expression 15]

$$\left( \sum_j (\phi j)^2 + \sum_i (\theta i)^2 \right)$$

(2) Sum of difference from the previous step (angular change at infinitesimal time $\Delta t$)

[Expression 16]

$$\left( \sum_j (\Delta \phi j)^2 + \sum_i (\Delta \theta i)^2 \right)$$

wher $\Delta \phi j = \phi j(t) - \phi j(t - \Delta t)$ $\Delta \theta i = \theta i(t) - \theta i(t - \Delta t)$ (3) Reciprocal number of absolute value of Jacobian matrix

[Expression 17]

$(1/|\det[J]|)$

In this case, J does not satisfy the constraint condition.

(4) Function to indicate the degree of approaching the joint limit (there are many functions)

In the control of a manipulator, it is more effective to operate each joint as a value smaller for any of the joint angles. Therefore a possible method is to define the evaluating function as the square-sum of the joint angles of the redundant joints, as shown in the above (1), and evaluate the joint angles so that the square-sum becomes smallest (minimum). Another possible method is to define the evaluating function as the square-sum of differences of the two adjacent joint angles, and evaluate low when the change of the two adjacent joint angles is large, and evaluate high when the change of the two adjacent joint angles is small. Another possible method is to define the evaluating function as the square-sum with a weight factor, which is obtained by multiplying each term by a weight factor, of which the total becomes 1, so that weight is added to each joint according to the position thereof. Also it is possible to define the evaluating function as a reciprocal number of the absolute value of the Jacobian matrix which provides sensitivity of the hand when the angular velocity of each joint angle is given, as shown in the above (3).

This invention, which is constructed as mentioned above, allows the calculation of the solution of the inverse kinematics problem required for controlling a robot as a numerical solution at high-speed, and allows on-line real-time control of joint angles. Therefore it is unnecessary to restrict an available manipulator to one having a structure with an analytical solution, and an arbitrary robot suitable for the purpose of use can be designed and manufactured. Also when the robot is operating, the control speed and control accuracy of linear interpolation, circular interpolation and curvilinear interpolation between two points improves. The interpolation accuracy between teaching points can also be improved in PTP (Point to Point: arbitrary positioning operation) control of the robot, CP (Continuous Path: linear interpolation operation) control and pseudo-CP control. Also even when force control, impedance control and hybrid control of the force and impedance are performed, control accuracy can be improved.

Needless to say, this invention can be applied not only to the control of a manipulator, that is control of each joint angle, but also to control various robots comprised of a plurality of joints and arms, such as production robots, nursing robots and pet robots.

What is claimed is:

1. A method of controlling a redundant manipulator for controlling the operation of a hand of a redundant manipulator, comprised of a plurality of arms sequentially connected to said hand via joints comprised of redundant joints and non-redundant joints, by determining a joint angle that each of said joints forms when the position and direction of the hand are specified, comprising:
    arbitrarily classifying said joints into said redundant joints and said non-redundant joints;
    defining an evaluating function and constraint condition composed of joint angles ($\phi_j$) of said redundant joints and said joint angles ($\theta_i$) of said non-redundant joints;
    defining values of said joint angles ($\theta_i$) of said non-redundant joints as solutions obtained by using an inverse kinematics calculation;
    defining values of said joint angles ($\phi_j$) of said redundant joints as solutions where said evaluating function is to be minimized by applying an optimization method to said evaluating function composed of said joint angles ($\phi_j$) of said redundant joints provided as a parameter and said joint angles ($\theta_i$) of said non-redundant joints which is determined by said inverse kinematics calculation;
    evaluating on a basis of degree of satisfaction of said constraint condition, an optimal set of solutions ($\theta_i$, $\phi_j$) composed of said joint angles ($\theta_i$) of said non-redundant joints obtained by said inverse kinematics calculation and said joint angles ($\phi_j$) of said redundant joints obtained by said optimization method and;
    selecting either to change said values of said joint angles ($\phi_j$) of said redundant joints and determine new joint angles of said non-redundant joints by another inverse kinematics calculation or to classify arbitrarily said joints into new non-redundant and redundant joints and change said evaluating function or said constraint condition and set new initial values of joint angles of said redundant joints and determine new joint angles of said non-redundant joints by another inverse kinematics, if it is judged that said set of solutions ($\theta_i$, $\phi_j$) are not optimum.

2. The method of controlling a redundant manipulator according to claim 1, wherein said evaluating function is a square-sum of said joint angle of said redundant joint.

3. The method of controlling a redundant manipulator according to claim 1, wherein said evaluating function is a square-sum of the difference of two of said joint angles adjacent to each other.

4. The method of controlling a redundant manipulator according to claim 1, wherein said evaluating function is a reciprocal number of the absolute value of the Jacobian matrix that provides the sensitivity of the hand when the angular velocity of each of said joint angles is given.

5. The method of controlling a redundant manipulator according to claim 1, wherein in said inverse kinematics calculation and said calculation for determining the optimum solution of the joint angle, an integrated vector comprising said hand position vector and posture vector is used.

6. The method of controlling a redundant manipulator according to claim 5, wherein said integrated vector is a corrected integrated vector comprised of elements with a weight factor obtained by respectively multiplying each element by a positive weight factor of which the total becomes 1.

7. The method of controlling a redundant manipulator according to claim 5 or claim 6, wherein said inverse kinematics calculation is performed by the Newton-Raphson Method, in which an initial value is provided to said joint angle, then a product of the Jacobian inverse matrix multiplied by a difference vector between said integrated vector before correction and the target integrated vector is subtracted from said joint angle before correction to determine said joint angle after correction, then iterative calculation is performed for obtaining said integrated vector after correction by forward kinematics calculation based on said joint angle after said correction, and said joint angle after correction when the norm of said difference vector is converted to a predetermined value or less is regarded as an approximate solution.

8. The method of controlling a redundant manipulator according to claim 1, wherein the roll angle of said hand is determined independently from said other joint angles.

* * * * *